United States Patent
Kasslatter et al.

(10) Patent No.: US 11,029,155 B2
(45) Date of Patent: Jun. 8, 2021

(54) HIGH-PRECISION POSITION DETERMINATION FOR VEHICLES

(71) Applicant: Siemens Aktiengesellschaft, Munich (DE)

(72) Inventors: Fritz Kasslatter, Gablitz (AT); Thomas Ritter, Vienna (AT); Roland Wunder, Koenigsbrunn (DE)

(73) Assignee: SIEMENS MOBILITY GMBH, Munich (DE)

( * ) Notice: Subject to any disclaimer, the term of this patent is extended or adjusted under 35 U.S.C. 154(b) by 359 days.

(21) Appl. No.: 15/977,156

(22) Filed: May 11, 2018

(65) Prior Publication Data

US 2018/0328734 A1   Nov. 15, 2018

(30) Foreign Application Priority Data

May 12, 2017  (DE) .......................... 102017208061.2

(51) Int. Cl.
  *G01C 21/16*  (2006.01)
  *G01S 5/02*   (2010.01)
  (Continued)

(52) U.S. Cl.
  CPC .......... *G01C 21/165* (2013.01); *G01C 21/30* (2013.01); *G01S 5/02* (2013.01); *G01S 5/0263* (2013.01);
  (Continued)

(58) Field of Classification Search
  CPC ......... G01C 21/165; G01C 21/30; G01S 5/02; G01S 5/0263; G01S 5/0284; G01S 19/49
  See application file for complete search history.

(56) References Cited

U.S. PATENT DOCUMENTS

| 6,188,913 B1 | 2/2001 | Fukagawa et al. |
| 6,288,676 B1 | 9/2001 | Maloney |
| (Continued) | | |

FOREIGN PATENT DOCUMENTS

| DE | 102012208646 | 11/2013 |
| DE | 102013205057 | 8/2014 |

OTHER PUBLICATIONS

Papaiz Andrea et al: "Particle filtering with weight reshaping for opportunistic angle of arrival estimation in a vehicular scenario", 2015 IEEE 5th International Conference on Consumer Electronics—Berlin (ICCE-Berlin), IEEE, pp. 145-149, XP032855037, DOI: 10.1109/ICCE-BERLIN.2015.7391218, [gefunden am Jan. 25, 2016], Figure 3, section II. Aoa Opportunistic Estimation Model, section III. Particle Filtering Algorithm, section IV. B. Drift Moton Model (DMM), section V. Experimental Set-Up; 2015; pp. 145-149.

(Continued)

*Primary Examiner* — Hussein Elchanti
(74) *Attorney, Agent, or Firm* — Cozen O'Connor

(57) ABSTRACT

A method for high-precision position determination for vehicles, wherein the vehicles include devices for wireless communication with intelligent infrastructure devices, the precise position of the intelligent infrastructure device being known and the vehicles exchange status information with the intelligent infrastructure devices at predefined time intervals, and wherein the intelligent infrastructure devices have devices for determining the direction of the received signals carrying the status information, in which the status information sent from the vehicles to the intelligent infrastructure devices includes at least the vehicle identifier and information about the speed and the direction of the vehicle, and in which the position of the vehicles is determined via trigonometric methods from consecutive sets of status information, the associated known time intervals, the direction of the (Continued)

signals carrying the status information and the position of the intelligent infrastructure devices.

4 Claims, 4 Drawing Sheets

(51) Int. Cl.
    *G01C 21/30*     (2006.01)
    *G01S 19/49*     (2010.01)
    *G01S 3/14*     (2006.01)
    *G08G 1/01*     (2006.01)

(52) U.S. Cl.
    CPC ............ *G01S 5/0284* (2013.01); *G01S 19/49* (2013.01); *G01S 3/14* (2013.01); *G08G 1/0112* (2013.01)

(56) References Cited

U.S. PATENT DOCUMENTS

| | | | | |
|---|---|---|---|---|
| 8,700,299 | B2* | 4/2014 | Morita | G08G 1/096716 |
| | | | | 701/123 |
| 10,365,115 | B2* | 7/2019 | Nair | G08G 1/096844 |
| 2005/0187701 | A1* | 8/2005 | Baney | G08G 1/096716 |
| | | | | 701/117 |
| 2009/0167561 | A1* | 7/2009 | Liang | G08G 1/0104 |
| | | | | 340/907 |
| 2009/0287401 | A1* | 11/2009 | Levine | G08G 1/0141 |
| | | | | 701/117 |
| 2010/0171640 | A1* | 7/2010 | Delia | G08G 1/07 |
| | | | | 340/907 |
| 2011/0223940 | A1 | 9/2011 | Zhong et al. | |
| 2012/0271540 | A1* | 10/2012 | Miksa | B60W 30/12 |
| | | | | 701/409 |
| 2014/0278074 | A1* | 9/2014 | Annapureddy | G08G 1/0141 |
| | | | | 701/468 |
| 2014/0336913 | A1* | 11/2014 | Fino | G01C 21/34 |
| | | | | 701/117 |
| 2015/0145995 | A1* | 5/2015 | Shahraray | H04L 67/12 |
| | | | | 348/148 |
| 2015/0168169 | A1* | 6/2015 | Caceres | G08G 1/0112 |
| | | | | 701/537 |
| 2016/0080486 | A1* | 3/2016 | Ram | H04L 12/1822 |
| | | | | 709/205 |
| 2016/0148507 | A1* | 5/2016 | Pittman | G06Q 30/0255 |
| | | | | 340/917 |
| 2016/0358463 | A1* | 12/2016 | Cho | G08G 1/04 |
| 2016/0364678 | A1* | 12/2016 | Cao | G06Q 50/30 |
| 2017/0154525 | A1* | 6/2017 | Zou | G08G 1/08 |
| 2018/0075739 | A1* | 3/2018 | Ginsberg | G08G 1/0133 |
| 2018/0151064 | A1* | 5/2018 | Xu | G08G 1/0116 |
| 2018/0253968 | A1* | 9/2018 | Yalla | G08G 1/097 |
| 2019/0272747 | A1* | 9/2019 | Raamot | G08G 1/0129 |

OTHER PUBLICATIONS

Fascista Alessio et al., "A Localization Alogorithm Based on V2I Communications and AOA Estimation", IEEE Signal Processing Letters, vol. 24, No. 1, pp. 126-130, Jan. 2017.

* cited by examiner

HIGH-PRECISION POSITION DETERMINATION FOR VEHICLES

BACKGROUND OF THE INVENTION

1. Field of the Invention

The invention relates to a method for high-precision position determination for vehicles.

2. Description of the Related Art

The networking of intelligent traffic systems is currently already contributing significantly to making traffic safer, more efficient and more sustainable. The possibilities of these cooperative systems, also called cooperative intelligent transportation system technology (C-ITS) are constantly increasing and will make a significant contribution to enabling automated driving and thus a technology leap for our mobility system.

A significant precondition for this is high-precision position determination of the participants.

Conventional navigation systems, such as the satellite navigation systems NAVSTAR, GLONASS or in future GALILEO with a precision of a few meters, do not satisfy these requirements.

To increase the precision of position determination, satellite reference services, such as the German SAPOS system are known, in which the global navigation satellite systems are observed round the clock via a network of reference stations, and corresponding correction data is calculated from the observations. This is then made available to the users, for example, by mobile radio. In this way, precise measurements with an accuracy of 1-2 cm are possible.

The use of satellite navigation systems is, however, linked to the receipt of the signals from at least 4 satellites. Hence, for example, "dead reckoning" is used in tunnels, whereby location determination occur approximately based on the movement characteristics determined via sensors, such as the speed of the vehicle in particular. This method is insufficient for the requirements of high-precision position determination.

SUMMARY OF THE INVENTION

In view of the foregoing, it is an object of the present invention to provide a method for high-precision position determination which supplies reliable results even in areas without satellite navigation.

This and other objects and advantages are achieved in accordance with the invention by a method for high-precision position determination for vehicles, where the vehicles have devices for wireless communication with intelligent infrastructure devices, the precise position of the intelligent infrastructure device is known and the vehicles exchange status information with the intelligent infrastructure devices at predefined time intervals and where the intelligent infrastructure devices have devices for determining the direction of the received signals carrying the status information. In accordance with the method of the invention, the status information sent from the vehicles to the intelligent infrastructure devices comprises at least the vehicle identifier and information about the speed and the direction of the vehicle, and the position of the vehicles is determined via trigonometric methods from consecutive sets of status information, the associated known time intervals, the direction of the signals carrying the status information and the position of the intelligent infrastructure devices.

BRIEF DESCRIPTION OF THE DRAWINGS

The invention is described in more detail with reference to figures, in which.

DETAILED DESCRIPTION OF THE EXEMPLARY EMBODIMENTS

The method in accordance with the invention for high-precision position determination is intended for vehicles which have means for wireless communication with intelligent infrastructure devices. In this so-called car-to-infrastructure (Car-to-X) communication information about road conditions, traffic flow, congestion, and potential hazards such as accidents, oncoming vehicles or stationary vehicles is exchanged.

For such information, which in part is relevant to safety, communication by vehicles via mobile radio is suitable only to a limited extent because of the restricted availability.

Hence, a standard has been developed with IEEE-WAVE/ITS-G5, by means of which WLAN technology is to be established in passenger vehicles, and a reliable interface for intelligent traffic system applications is to be created.

According to the invention communication that has occurred based on the IEEE-WAVE/ITS-G5 standard between a vehicle and intelligent infrastructure devices—so called roadside units (RSU)—is now employed for high-precision position determination.

To this end, status information is sent from the vehicle to the roadside units RSU at regular time intervals t1, t2, typically about every 100 msec, and also comprises, in addition to a unique vehicle identifier $I_{v1}$, at least information about the speed $V_{v1}$ and the direction of the vehicle $H_{v1}$.

Based on the speed and the known time interval between two sets of status information, the distance $d_{v1(t2-t1)}$ traveled in the time interval is determined.

Figure 1:
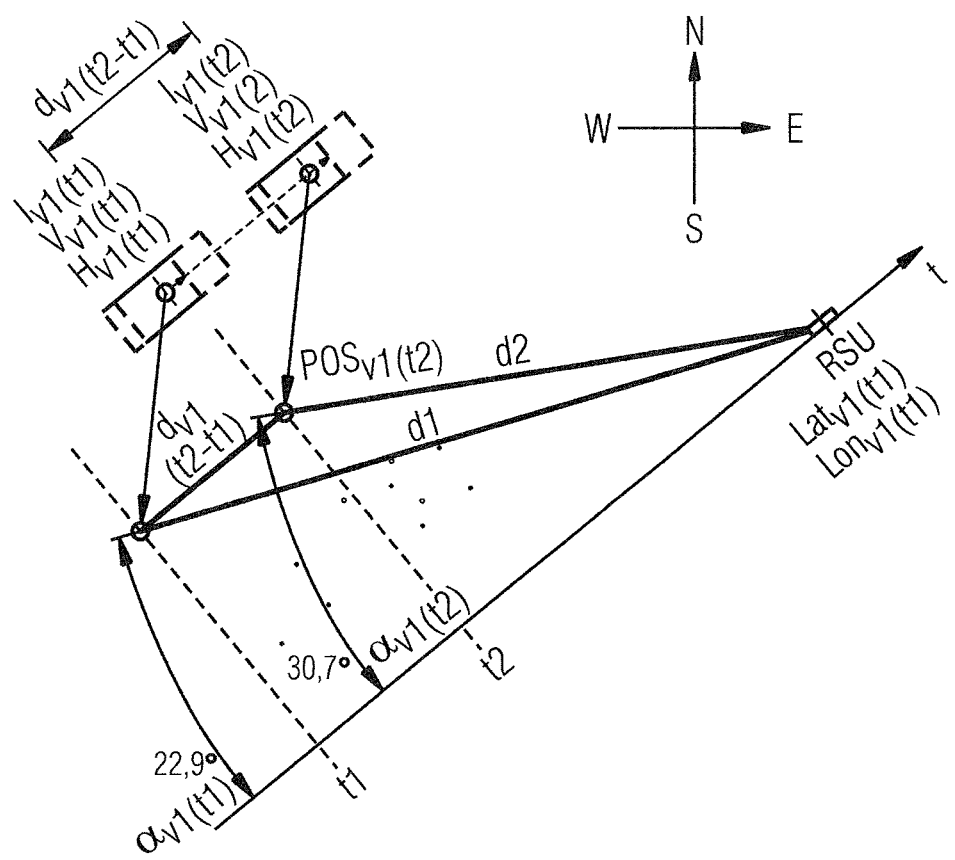
FIG. 1 schematically shows a first embodiment of the method in accordance with the invention.

Furthermore, the direction of the received signals d1, d2 carrying the status information is determined in the roadside units RSU in question. As illustrated in FIG. 1, the signals form, with the distance $d_{v1(t2-t1)}$ traveled, an oblique-angled triangle, wherein side length and direction of the base (of the distance traveled), plus the angles $\alpha_{v1(t1,t2)}$ of the sides (of the consecutive signals), are known.

From this information, trigonometric methods can be used to determine the position of the vehicle $Pos_{v1(t2)}$ relative to the roadside unit RSU, and because the absolute position $Lat_{v1}$, $Lon_{v1}$ thereof is known, to also determine the absolute position of the vehicle therefrom.

Figure 2:
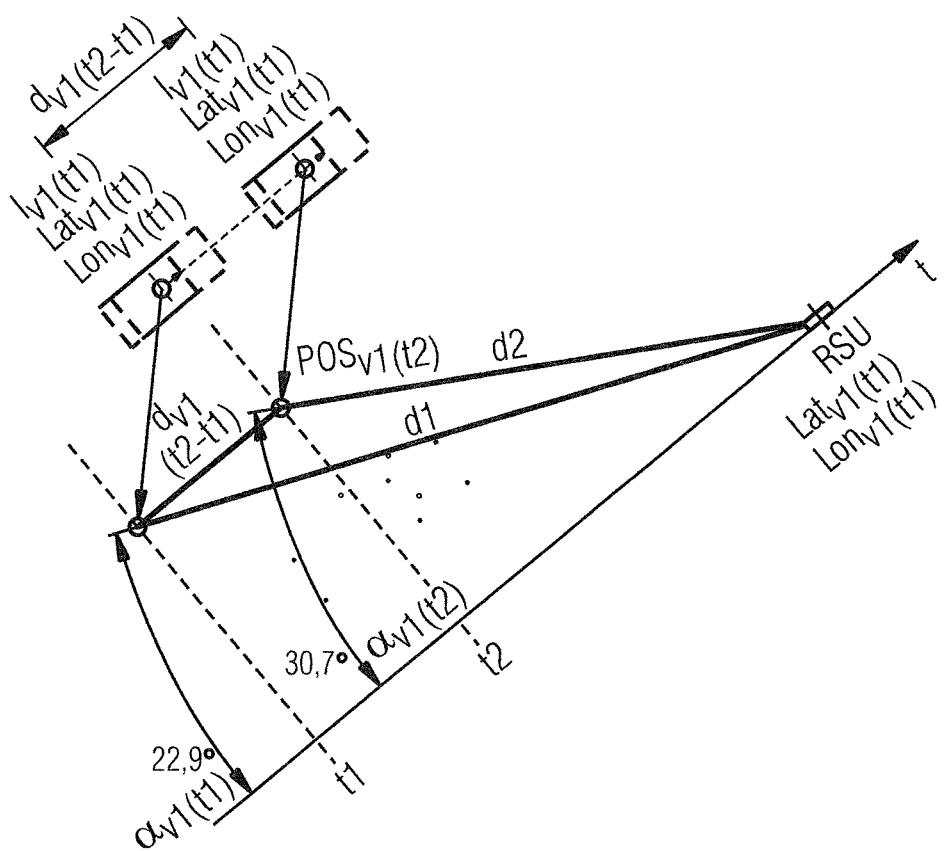
FIG. 2 schematically shows a second embodiment of the method in accordance with the invention.

The direction $H_{v1}$ of the distance $d_{v1(t2-t1)}$ traveled can, for example, be determined in the vehicle via a compass or else by evaluating data from a satellite navigation system $Lat_{v1}$, $Lon_{v1}$, as is schematically illustrated in FIG. 2. The precondition for this is of course that this data can be received.

Figure 3:
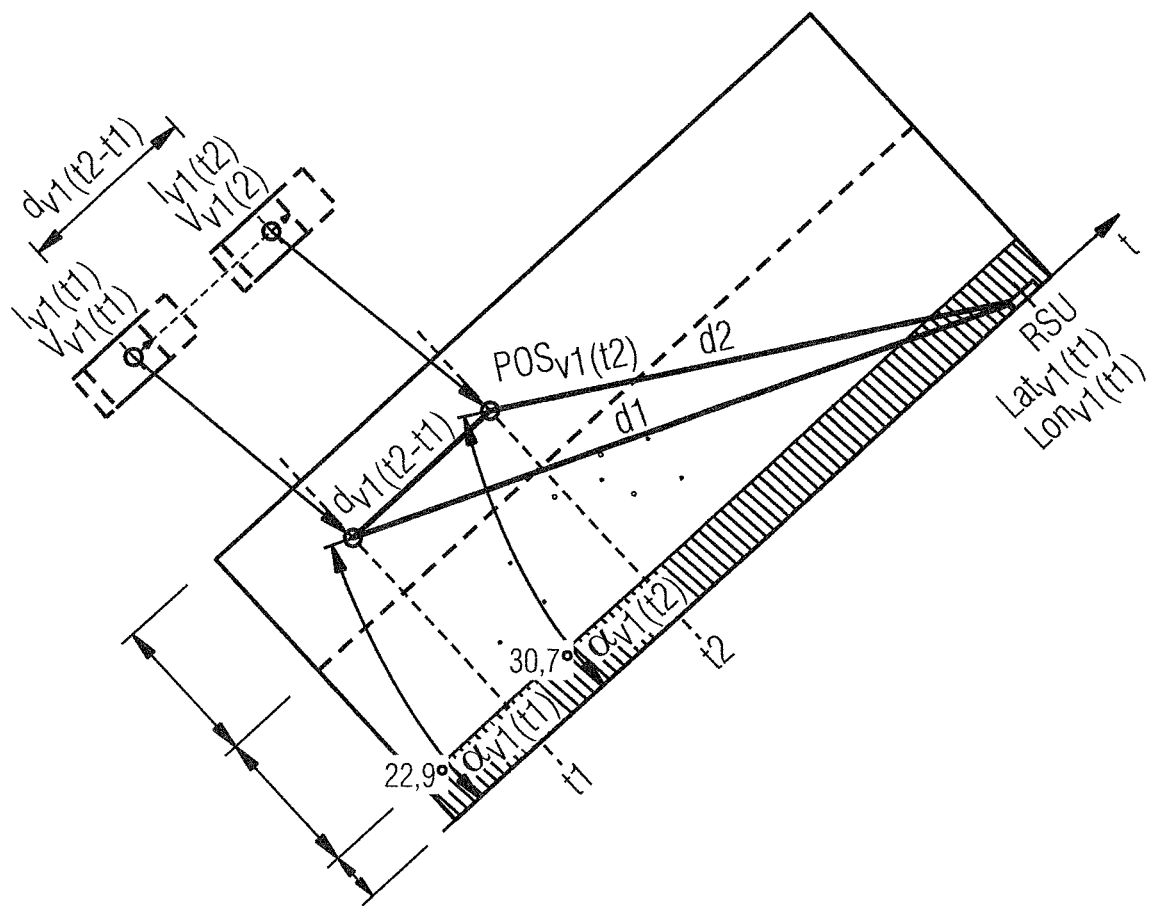
FIG. 3 schematically shows a third embodiment of the method in accordance with the invention.
Figure 4:
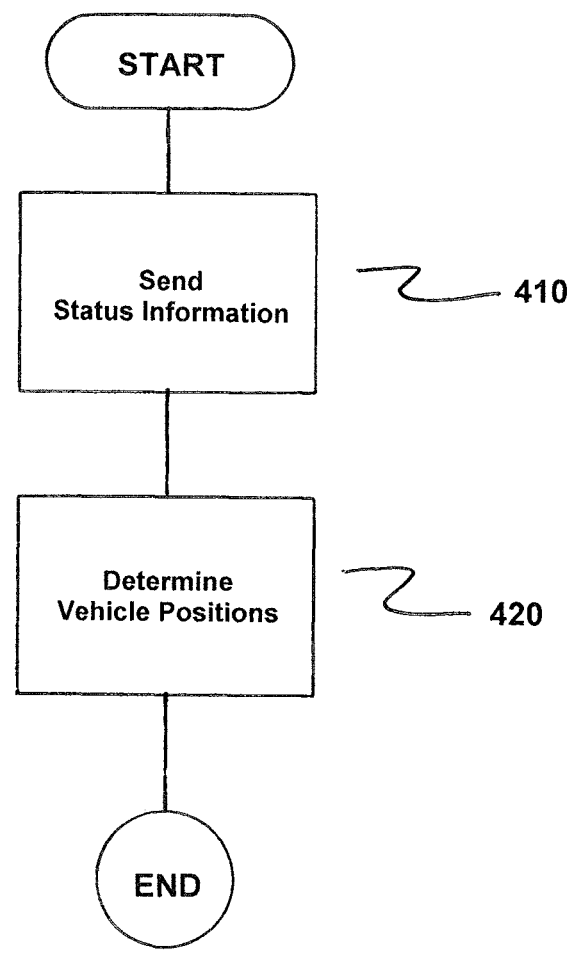
FIG. 4 is a flowchart of the method in accordance with the invention.

As is schematically illustrated in FIG. 3, data from a digital road map can also be taken into consideration during position determination.

FIG. 2 is a flowchart of the method for high-precision position determination for vehicles including devices for wireless communication with intelligent infrastructure devices, where a precise position of the intelligent infrastructure device is known and the vehicles exchange status information with the intelligent infrastructure devices at predefined time intervals, and the intelligent infrastructure devices have devices for determining a direction of the received signals carrying the status information. The method comprises sending status information from the vehicles to the intelligent infrastructure devices RSU, as indicated in step 210. In accordance with the invention, the status information comprising at least a vehicle identifier Iii and information about a speed $V_{V1}$ and the direction of the vehicle $H_{V1}$.

Next, the position of the vehicles is determined via trigonometric methods from consecutive sets of status information, the associated known time intervals, a direction of signals d1, d2 carrying the status information and the position of the intelligent infrastructure devices, as indicated in step 220.

What is claimed is:

1. A method for increased high-precision position determination of of vehicles including devices for wireless communication with intelligent infrastructure devices, a precise position of the intelligent infrastructure device being known and the vehicles exchanging status information with the intelligent infrastructure devices at predefined time intervals, and the intelligent infrastructure devices have devices for determining a direction of the received signals carrying the status information, the method comprising:

sending status information from the vehicles to the intelligent infrastructure devices based on wireless access in vehicular environments (WAVE)/Intelligent Transportation Systems (ITS) standards, said status information comprising at least a vehicle identifier and information about a speed and the direction of the vehicle;

determining the position of the vehicles via trigonometric methods from consecutive sets of status information, the associated known time intervals, a direction of signals carrying the status information and the position of the intelligent infrastructure devices to provide the increased high-precision position determination of the vehicles;

determining a distance traveled by the vehicle in a time interval from at least two sets of transmitted status information; determining a direction of the consecutive signals carrying the status information;

determining a position of the vehicles relative to the intelligent infrastructure devices via the trigonometric methods from the directions of the consecutive signals, and from the distance traveled; and determining an absolute position of the vehicles from an absolute position of the intelligent infrastructure devices and the relative position of the vehicles.

2. The method as claimed in claim 1, wherein position data specified via satellite navigation is sent from the vehicles as additional status information; and wherein the distance traveled by the vehicle in the time interval is determined from at least two sets of transmitted position data specified via satellite navigation.

3. The method as claimed in claim 1, wherein data from a digital road map is taken into consideration during position determination.

4. The method as claimed in claim 2, wherein data from a digital road map is taken into consideration during position determination.

* * * * *